Figure 1:
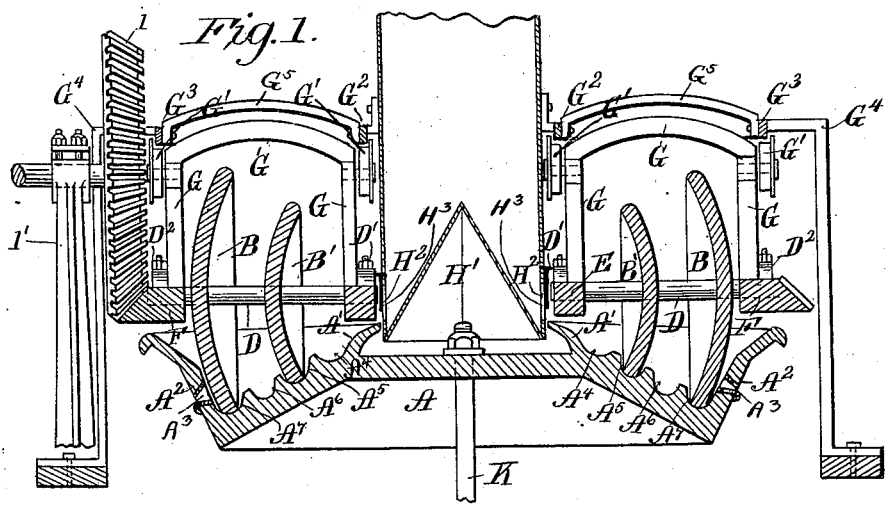

No. 614,074. Patented Nov. 15, 1898.
H. BANFIELD.
CRUSHING OR AMALGAMATING MILL.
(Application filed Aug. 12, 1895.)
(No Model.)

Witnesses:—
W. C. Pinckney
W. E. Bowen

Inventor:
Henry Banfield,
By J. E. W. Bowen,
Attorney

UNITED STATES PATENT OFFICE.

HENRY BANFIELD, OF ADELAIDE, SOUTH AUSTRALIA.

CRUSHING OR AMALGAMATING MILL.

SPECIFICATION forming part of Letters Patent No. 614,074, dated November 15, 1898.

Application filed August 12, 1895. Serial No. 559,007. (No model.)

*To all whom it may concern:*

Be it known that I, HENRY BANFIELD, mechanical engineer, a subject of the Queen of Great Britain, residing in Adelaide, in the Province of South Australia, have invented a certain new and useful Improvement in Crushing or Amalgamating Mills, (for which I have obtained a patent in South Australia, No. 2,777, dated September 12, 1894, and in New South Wales, No. 5,401, dated October 19, 1894,) of which the following is a specification.

My invention relates to crushing or amalgamating mills used more particularly for the reduction or amalgamation of metalliferous ores, but applicable also to other purposes in which fine and uniform crushing is required.

The objects of my invention are to so shape the rollers used with reference to the grooves in which they are made to travel that friction between the same will be reduced as much as possible and to permit of the use of rollers of comparatively large diameter; also, to so locate the rollers with reference to each other and to the grooves that a large number of rollers may be employed to advantage and to so construct the framework of the apparatus as to make it capable of ready adjustment at all times.

My improvements consist, essentially, in constructing such mills with a pan or circular race fed from a central chute, the floor of which pan or circular race is raised toward the inner rim or wall and descends by steps, preferably four, in the form of concentric grooves or channels to the outer rim or wall, and in providing a series of rolls or disks arranged in groups or pairs, each roll or disk being preferably hollowed or dished and of such diameter as to correspond with the groove or channel in which it runs. Each group of said dished rollers preferably comprises but a half (or other fraction) as many rollers as there are grooves in the pan, and in each group the rollers occupy alternate grooves. In the preferred form of my apparatus the groups of rollers are so near together that the rollers of the different groups overlap each other, as clearly shown in Fig. 2.

The upper edge of outer wall or rim of the pan or circular race is on the same level as that of the inner rim or wall and is provided at suitable intervals with lips or chutes, over which the reduced material discharges for subsequent treatment. The bottom of each concentric groove or channel is preferably rounded, but may be of any suitable shape. The rolls or disks, preferably sixteen in number, are arranged in alternate pairs and have the periphery shaped to the bottom of the respective concentric groove or channel. The axle of each pair is supported at its inner end in suitable bearings in a circular traveling piece placed over the inner rim or wall of the pan or circular race and at its outer end in a circular bed provided with beveled teeth and driven by a suitable gearwheel. By this construction the axles carrying the disks revolve in their bearings and the whole of the disks are carried around the pan or circular race by revolution of the outer circular toothed bed. The depth of the pan or circular race increasing in steps toward the circumference, the diameter of the disks is similarly increased in regular progression, the smallest disk running in the innermost and the widest in the outermost concentric groove or channel.

The pan or circular race is fed from a stationary central vertical chute connected overhead with a supply-hopper and is provided at its base with openings capable of being adjusted by suitable slides in order to regulate the flow of material. Inside and at the base of the central vertical feed-chute is placed a four-sided-pyramid distributer, so as to direct the ore in a constant stream through the respective openings over the inner wall of the pan or circular race.

In order that my invention may be the better understood, I will now proceed to describe the same by reference to the accompanying drawings, in which—

Figure 2:
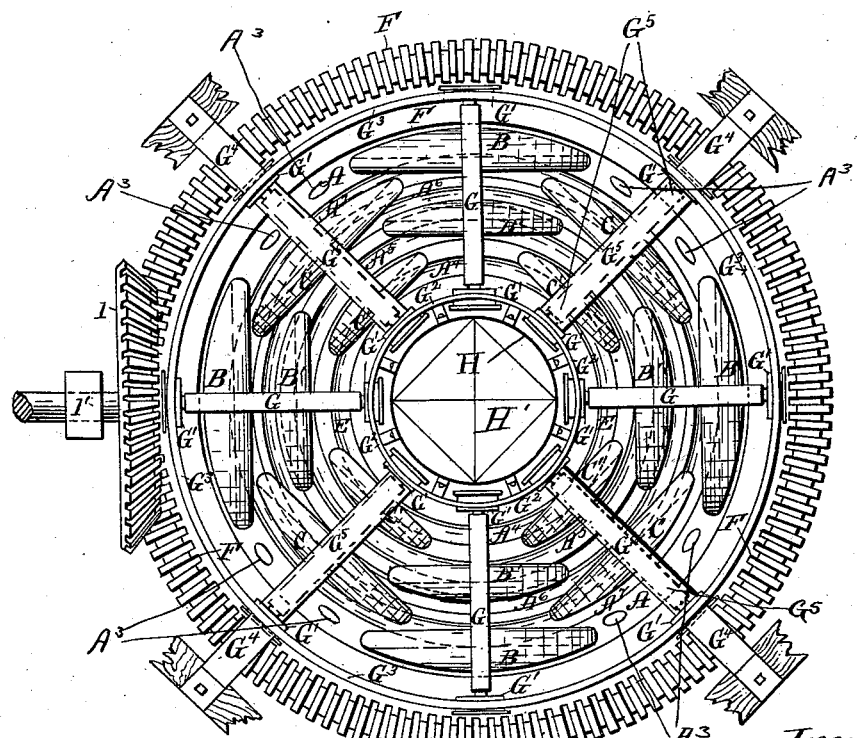

Figure 1 is a sectional elevation of my improved mill; Fig. 2, plan of same.

A is a pan or circular race having an inclined bottom arranged in steps; $A'$, inner wall of pan or circular race A; $A^2$, outer wall of same; $A^3$, discharge-openings; $A^4 A^5 A^6 A^7$, steps or concentric grooves or channels in floor or bottom of circular race A; B B′ C C′, hollowed or dished disks arranged in groups or pairs, C running in $A^6$, B in $A^7$, C′ in $A^4$, and B′ in $A^5$; D D, axles carrying respective pairs of hollowed or dished disks; D' D', inner bearing of axles D; D² D², outer bearings of axles D; E, center piece carrying the inner bearings D' of axles D; F, circular toothed and revolving bed carrying outer bearings D² of axles D; G, stays connecting the center piece E with the outer toothed bed F; G', antifriction-rollers attached to the stays G; G² G³, circular and continuous inner and outer guide-rails of antifriction-rolls G' G', along which said rolls are made to travel and which prevent frames E and F and disks B B' and C C' from being forced upward to any considerable extent while said disks are crushing the ore.

G⁴ are standards secured to the floor and carrying outer guide-rails G³.

G⁵ are arched rigid connections between guide-rails G² and G³, whereby standards G⁴ are also made to support inner guide-rails G²; H, stationary central feed secured to guide-rail G² and surrounded by the stationary and the revolving frame; H', four-sided-pyramid distributer in central feed H; H², feed-openings discharging over inner wall A' of pan or circular race A; H³, slides capable of wholly or partly and in varying degree covering said openings and regulating the discharge through same; I, beveled driving-wheel; I', bearing of same; K, bar securing pan or circular race to the bed for greater solidity.

In practice the ore is fed from any suitable hopper or other source of supply into the central feed H and passes in a continuous stream through the feed-openings H² over the inner wall A' and into the innermost concentric groove or channel A⁴ of the pan or circular race A. By means of the slides hereinbefore referred to the feed-openings H² are adjusted in order to control the supply of ore to the capacity of the mill and to enable the discharge to be equal to the supply.

The ore fed into the innermost groove or channel A⁴ receives its first reduction from the disks C' and is carried on into the next concentric ring or groove A⁵ by the flow of water provided for the purpose either in the central feed H or otherwise, as may be found convenient. In this way it passes from concentric groove to concentric groove until the outermost groove A⁷ is reached, and is finally carried over the lips or discharge-openings A⁸, reduced to the desired fineness.

I wish it to be understood that I do not confine myself to the number of concentric grooves or channels as shown, nor to the particular shape of the same, nor to the particular number of revolving rolls or disks, nor to the method by which the whole are carried around or caused to revolve in the pan.

Owing to the fact that the disks are made dishing and have their peripheries shaped to the contour of the grooves, they travel and perform their work therein with a minimum expenditure of power. By placing the rollers with reference to each other so as to have the rollers on one axle extend between the rollers on the adjoining axle I am enabled to operate a maximum number of rollers in the apparatus, and by making the traveling frame carrying the axles of the rollers and likewise the stationary frame along which the revolving frame travels extend over the rollers and making such stationary frame independent of the base carrying the grooves all parts of the apparatus are readily accessible and capable of proper adjustment at all times.

Having now particularly described and ascertained the nature of my said invention, I declare that what I claim is—

1. In crushing or amalgamating mills, the combination with a stationary base provided with a groove, of rollers adapted to travel therein, a revolving frame carrying the axles of said rollers, such revolving frame extending over the rollers, a stationary frame independent of said base, along which said revolving frame is guided, and a central feed surrounded by said frames, substantially as set forth.

2. In crushing or amalgamating mills, the combination with a stationary base provided with a groove, of rollers adapted to travel therein, a revolving frame carrying the axles of the rollers, a stationary frame independent of said base along which said revolving frame is guided, the revolving frame extending over the rollers and the stationary frame extending over said revolving frame, and a central feed surrounded by said frames, substantially as set forth.

3. In a crushing or amalgamating mill, the combination with bed A, having concentric grooves, A⁴, A⁵, A⁶, A⁷, rollers B, B', revolving frame E, F, G, stationary frame G², G³, G⁴, antifriction-rollers G', central feed H and pyramid H', substantially as set forth.

In witness whereof I have hereunto signed my name in the presence of two subscribing witnesses.

HENRY BANFIELD.

Witnesses:
EDWIN BLACKLER COLTON,
CHARLES STANLEY BURGESS.